United States Patent
Guthery

(10) Patent No.: US 8,322,610 B2
(45) Date of Patent: Dec. 4, 2012

(54) SECURE ACCESS MODULE FOR INTEGRATED CIRCUIT CARD APPLICATIONS

(75) Inventor: Scott B. Guthery, Chestnut Hill, MA (US)

(73) Assignee: Assa Abloy AB (SE)

( * ) Notice: Subject to any disclaimer, the term of this patent is extended or adjusted under 35 U.S.C. 154(b) by 43 days.

(21) Appl. No.: 12/724,081

(22) Filed: Mar. 15, 2010

(65) Prior Publication Data

US 2010/0230490 A1 Sep. 16, 2010

Related U.S. Application Data

(60) Provisional application No. 61/160,191, filed on Mar. 13, 2009.

(51) Int. Cl.
- G06K 5/00 (2006.01)
- G06K 7/01 (2006.01)
- G06K 7/00 (2006.01)
- G06K 7/08 (2006.01)
- G06K 19/00 (2006.01)

(52) U.S. Cl. ............... 235/382; 235/382.5; 235/435; 235/449; 235/451; 235/487

(58) Field of Classification Search .......... 235/382, 235/382.5, 487, 492, 435
See application file for complete search history.

(56) References Cited

U.S. PATENT DOCUMENTS

| | | | |
|---|---|---|---|
| 3,920,896 A | 11/1975 | Bishop et al. | |
| 3,958,088 A | 5/1976 | Vieri | |
| 4,703,503 A | 10/1987 | Asai | |
| 5,377,997 A | 1/1995 | Wilden et al. | |
| 5,438,650 A | 8/1995 | Motoyama et al. | |
| 5,572,195 A | 11/1996 | Heller et al. | |
| 5,651,006 A | 7/1997 | Fujino et al. | |
| 5,758,083 A | 5/1998 | Singh et al. | |
| 5,828,830 A | 10/1998 | Rangaraian et al. | |
| 5,987,513 A | 11/1999 | Prithviraj et al. | |
| 6,219,718 B1 | 4/2001 | Villalpando | |
| 6,272,542 B1 | 8/2001 | Barnes et al. | |
| 6,356,949 B1 | 3/2002 | Katsandres et al. | |
| 6,360,258 B1 | 3/2002 | LeBlanc | |
| 6,367,011 B1 | 4/2002 | Lee et al. | |
| 6,484,225 B2 | 11/2002 | Sheikh et al. | |
| 6,490,680 B1 | 12/2002 | Scheidt et al. | |
| 6,516,357 B1 | 2/2003 | Hamann et al. | |
| 6,616,535 B1 * | 9/2003 | Nishizaki et al. | ............ 463/43 |
| 6,675,351 B1 | 1/2004 | Leduc | |

(Continued)

FOREIGN PATENT DOCUMENTS

EP 1724684 5/2005

(Continued)

OTHER PUBLICATIONS

"RFC 1661: The Point-to-Point Protocol (PPP)," Network Working Group (W. Simpson, ed.), Jul. 1994, pp. 1-52.

(Continued)

Primary Examiner — Daniel Walsh
(74) Attorney, Agent, or Firm — Sheridan Ross P.C.

(57) ABSTRACT

Mechanisms are provided for executing security-sensitive applications with a general-purpose computing device. In particular, the general-purpose computing device includes an unsecure computing environment and a secure computing environment. The secure computing environment is established with a secure access module that includes data and functions for executing the security-sensitive application on behalf of the unsecure computing environment.

25 Claims, 2 Drawing Sheets

U.S. PATENT DOCUMENTS

| | | | |
|---|---|---|---|
| 6,757,280 | B1 | 6/2004 | Wilson, Jr. |
| 6,823,453 | B1 | 11/2004 | Hagerman |
| 6,824,049 | B2 * | 11/2004 | Lee et al. ............... 235/380 |
| 6,880,752 | B2 * | 4/2005 | Tarnovsky et al. ........... 235/382 |
| 6,959,394 | B1 | 10/2005 | Brickell et al. |
| 6,986,139 | B1 | 1/2006 | Kubo |
| 7,036,146 | B1 | 4/2006 | Goldsmith |
| 7,070,091 | B2 | 7/2006 | Hepworth et al. |
| 7,092,915 | B2 | 8/2006 | Best et al. |
| 7,171,654 | B2 | 1/2007 | Werme et al. |
| 7,194,628 | B1 | 3/2007 | Guthery |
| 7,242,694 | B2 | 7/2007 | Beser |
| 7,270,266 | B2 | 9/2007 | Silverbrook et al. |
| 7,321,566 | B2 | 1/2008 | Fu |
| 7,363,489 | B2 | 4/2008 | Burakoff et al. |
| 7,406,592 | B1 | 7/2008 | Polyudov |
| 7,506,041 | B1 | 3/2009 | Shelton et al. |
| 7,620,041 | B2 | 11/2009 | Dunn et al. |
| 7,634,295 | B2 * | 12/2009 | Hayaashi et al. .......... 455/556.1 |
| 7,669,212 | B2 | 2/2010 | Alao et al. |
| 7,716,355 | B2 | 5/2010 | McCloghrie et al. |
| 7,742,183 | B2 | 6/2010 | Sato |
| 7,788,403 | B2 | 8/2010 | Darugar et al. |
| 7,853,643 | B1 | 12/2010 | Martinez et al. |
| 2002/0138582 | A1 | 9/2002 | Chandra et al. |
| 2002/0161598 | A1 * | 10/2002 | Kim ................................ 705/1 |
| 2002/0199096 | A1 | 12/2002 | Wenocur et al. |
| 2003/0115466 | A1 | 6/2003 | Aull et al. |
| 2003/0131051 | A1 | 7/2003 | Lection et al. |
| 2004/0040026 | A1 | 2/2004 | Farrugia |
| 2004/0151322 | A1 | 8/2004 | Sovio et al. |
| 2004/0158625 | A1 | 8/2004 | Neale |
| 2004/0204778 | A1 | 10/2004 | Lalapeth et al. |
| 2004/0247118 | A1 * | 12/2004 | Tateno et al. .................... 380/44 |
| 2005/0009564 | A1 * | 1/2005 | Hayaashi et al. ............. 455/558 |
| 2005/0105508 | A1 | 5/2005 | Saha |
| 2005/0262229 | A1 | 11/2005 | Gattu et al. |
| 2006/0023674 | A1 | 2/2006 | Goring et al. |
| 2006/0053210 | A1 | 3/2006 | Dague et al. |
| 2006/0059253 | A1 | 3/2006 | Goodman et al. |
| 2006/0095957 | A1 | 5/2006 | Lundblade et al. |
| 2006/0195594 | A1 | 8/2006 | Fujimori et al. |
| 2007/0057057 | A1 | 3/2007 | Andresky et al. |
| 2007/0064623 | A1 | 3/2007 | Brahmaroutu |
| 2007/0067833 | A1 | 3/2007 | Colnot |
| 2007/0169183 | A1 | 7/2007 | Kipnis et al. |
| 2007/0174907 | A1 | 7/2007 | Davis |
| 2007/0180086 | A1 | 8/2007 | Fang et al. |
| 2007/0209040 | A1 | 9/2007 | Alstad |
| 2007/0217425 | A1 | 9/2007 | Mclaise et al. |
| 2007/0249323 | A1 | 10/2007 | Lee et al. |
| 2007/0276935 | A1 | 11/2007 | Liu |
| 2007/0282951 | A1 | 12/2007 | Selimis et al. |
| 2008/0016370 | A1 | 1/2008 | Libin et al. |
| 2008/0095339 | A1 | 4/2008 | Elliott et al. |
| 2008/0133391 | A1 | 6/2008 | Kurian et al. |
| 2008/0204429 | A1 | 8/2008 | Silverbrook et al. |
| 2009/0013190 | A1 | 1/2009 | Benhammou et al. |
| 2009/0028118 | A1 | 1/2009 | Gray et al. |
| 2009/0157700 | A1 | 6/2009 | Van Vugt |
| 2010/0077091 | A1 | 3/2010 | Sarkar et al. |
| 2010/0230490 | A1 * | 9/2010 | Guthery ........................ 235/382 |

FOREIGN PATENT DOCUMENTS

| | | |
|---|---|---|
| EP | 1895445 | 3/2008 |
| WO | WO 2005/078465 | 8/2005 |

OTHER PUBLICATIONS

"RFC 707: A High-Level Framework for Network-Based Resource Sharing," Network Working Group, Jan. 1976, pp. 1-28.

Aboba, B. et al., "RFC 3748, Extensible Authentication Protocol," Network Working Group (H. Levkowetz, ed.), Jun. 2004, pp. 1-67.

Arkko, J. et al., "RFC 4187: Extensible Authentication Protocol Method for 3rd Generation Authentication and Key Agreement (EAP-AKA)," Network Working Group, Jan. 2006, pp. 1-79.

Benaloh, J. et al., "Generalized Secret Sharing and Monotone Functions," Advances in Cryptology—CRYPTO '88, Santa Barbara, CA (S. Goldwasser ed., Aug. 1988); Lecture Notes in Computer Science, vol. 403 (G. Goos and J. Hartmanis, eds. 1990), pp. 27-35.

Blumenthal, U. et al., "RFC 3826: The Advanced Encryption Standard (AES) Cipher Algorithm in the SNMP User-based Security Model," Network Working Group, Dec. 2002, pp. 1-16.

Blumenthal, U. et al., "Standard 62—RFC 3414: User-based Security Model (USM) for Version 3 of the Simple Network Management Protocol (SNMPv3)," Network Working Group, Dec. 2002, available at www.ietf.org/rfc/rfc3414.txt, pp. 1-88.

Bormann, C. et al., "RFC 3095: RObust Header Compression (ROHC): Framework and Four Profiles: RTP, UDP, ESP, and Uncompressed," Network Working Group, Jul. 2001, available at www.ietf.org/rfc/rfc3095.txt, pp. 1-168.

Case, J. et al., "Standard 62—RFC 3412: Message Processing and Dispatching for the Simple Network Management Protocol (SNMP)," Network Working Group, Dec. 2002, available at www.ietf.org/rfc/rfc3412.txt, pp. 1-43.

Casner, S. et al., "RFC 2508: Compressing IP/UDP/RTP Headers for Low-Speed Serial Links," Network Working Group, Feb. 1999, pp. 1-24.

Chiu, A., "RFC 2695: Authentication Mechanisms for ONC RPC," Network Working Group, Sep. 1999, pp. 1-18.

Degermark, M., ed., "RFC 3096: Requirements for Robust IP/UDP/RTP Header Compression," Network Working Group, Jul. 2001, pp. 1-8.

Eisler, M., ed., "RFC 4506: XDR: External Data Representation Standard," replaced RFC 1832, Network Working Group, May 2006, pp. 1-27.

Finking, R. et al., "RFC 4997: Formal Notation for RObust Header Compression (ROHC-FN)," Network Working Group, Jul. 2007, pp. 1-62.

Geer, D.E. et al., "Threshold Cryptography for the Masses," Sixth International Financial Cryptography Conference, Southampton, Bermuda, Mar. 2002, Revised Papers, Lecture Notes in Computer Science, vol. 2357 (2003), pp. 220-237.

Guthery, S. et al., "IP and ARP over ISO 7816," Internet Draft, Network Working Group, Jan. 2001, pp. 1-8.

Guthery, S. et al., "IP/TCP/UDP Header Compression for ISO 7816 Links," Internet Draft, Network Working Group, Jan. 2001, pp. 1-8.

Guthery, S., "EchoNets, E-memes, and Extended Realities," Dr. Dobb's Journal, Apr. 1, 1994, pp. 72-84, also available at http://www.drdobbs.com/architect/184409220.

Guthery, S., "Wireless Relay Networks," IEEE Network, vol. 11, No. 6, Nov.-Dec. 1997, pp. 46-51.

Guthery, S.B., "Group Authentication Using the Naccache-Stern Public-Key Cryptosystem", arXiv.org > cs > arXiv:cs/0307059 (2003), 7 pages.

Harrington, D. et al., "Secure Shell Transport Model for SNMP," Internet Draft, Network Working Group, Oct. 11, 2006, pp. 1-37.

Harrington, D. et al., "Standard 62—RFC 3411: An Architecture for Describing Simple Network Management Protocol (SNMP) Management Frameworks," Network Working Group, Dec. 2002, available at www.ietf.org/rfc/rfc3411.txt, pp. 1-64.

Harrington, D. et al., "Transport Subsystem for the Simple Network Management Protocol (SNMP)," Internet Draft, Network Working Group, Dec. 13, 2006, pp. 1-34.

Harrington, D., "Transport Security Model for SNMP," Internet Draft, Network Working Group, Oct. 11, 2006, pp. 1-34.

Housley, R. et al. "RFC 4334: Certificate Extensions and Attributes Supporting Authentication in Point-to-Point Protocol (PPP) and Wireless Local Area Networks (WLAN)," Network Working Group, Feb. 2006, pp. 1-11.

Jonsson, L-E. et al., RFC 4815: RObust Header Compression (ROHC): Corrections and Clarifications to RFC 3095, Network Working Group, Feb. 2007, pp. 1-33.

Jonsson, L-E. et al., "RFC 4995: The Robust Header Compression (ROHC) Framework," Network Working Group, Jul. 2007, pp. 1-40.

Jonsson, L-E., "RFC 3759: RObust Header Compression (ROHC): Terminology and Channel Mapping Examples," Network Working Group, Apr. 2004, pp. 1-20.

Koren, T. et al., "RFC 3544: IP Header Compression over PPP," Network Working Group, Jul. 2003, pp. 1-14.

Larzon, L-A. et al. "RFC 3828: The Lightweight User Datagram Protocol (UDP-Lite)," Network Working Group, Sep. 2006, pp. 1-12.

Leach, P. et al., "RFC 4122: A Universally Unique IDentifier (UUID) URN Namespace," Network Working Group, Jul. 2005, pp. 1-32.

Levi, D. et al., "Standard 62—RFC 3413: Simple Network Management Protocol (SNMP) Application," Network Working Group, Dec. 2002, available at www.ietf.org/rfc/rfc3413.txt, pp. 1-74.

McCloghrie, K. et al., eds., "RFC 2579: Textual Conventions for SMIv2," Network Working Group, Apr. 1999, pp. 1-26.

McCloghrie, K. et al., eds., "RFC 2580: Conformance Statements for SMIv2," Network Working Group, Apr. 1999, pp. 1-29.

McCloghrie, K., ed., "Standard 58—RFC 2578: Structure of Management Information Version 2 (SMIv2)," Network Working Group, Apr. 1999, pp. 1-43.

Naccache et al., "A New Public-Key Cryptosystem," published in W. Fumy, Ed., Advances in Cryptology—EUROCRYPT '97, vol. 1233 of Lecture Notes in Computer Science, pp. 27-36, Springer-Verlag, 1997.

Neuman, C. et al., "RFC 4120: The Kerberos Network Authentication Service (V5)," Network Working Group, Jul. 2005, pp. 1-138.

Pelletier, G., "RFC 4019: RObust Header Compression (ROHC): Profiles for User Datagram Protocol (UDP) Lite," Network Working Group, Apr. 2005, pp. 1-23.

Prafullchandra, H., "RFC 2875: Diffie-Hellman Proof-of-Possession Algorithms," Network Working Group, Jul. 2000, pp. 1-23.

Presuhn, R., ed., "Standard 62—RFC 3416: Version 2 of the Protocol Operations for the Simple Network Management Protocol (SNMP)," Network Working Group, Dec. 2002, pp. 1-31.

Presuhn, R., ed., "Standard 62—RFC 3417: Transport Mappings for the Simple Network Management Protocol (SNMP)," Network Working Group, Dec. 2002, pp. 1-19.

Presuhn, R., ed., Standard 62—RFC 3418: Management Information Base (MIB) for the Simple Network Management Protocol (SNMP), Network Working Group, Dec. 2002, pp. 1-26.

Rescorla, E., "RFC 2631: Diffie-Hellman Key Agreement Method," Network Working Group, Jun. 1999, pp. 1-13.

Shamir, "How to Share a Secret," Communications for the ACM, Nov. 1979, pp. 612-613.

Simpson, W., "RFC 1994: PPP Challenge Handshake Authentication Protocol (CHAP)," Network Working Group, Aug. 1996, pp. 1-12.

Simpson, W., ed., "RFC 1662: PPP in HDLC-like Framing," Network Working Group, Jul. 1994, pp. 1-25.

Srinivasan, R. et al., "RFC 1831: RPC: Remote Procedure Call Protocol Specification Version 2," Network Working Group, Aug. 1995, pp. 1-18.

Vanderveen, M. et al., RFC 4763: Extensible Authentication Protocol Method for Shared-secret Authentication and Key Establishment (EAP-SAKE), Network Working Group, Nov. 2006, pp. 1-46.

Vollbrecht, J. et al., "RFC 4137: State Machines for Extensible Authentication Protocol (EAP) Peer and Authenticator," Network Working Group, Aug. 2005, pp. 1-51.

Wijnen, B. et al., "Standard 62—RFC 3415: View-based Access Control Model (VACM) for the Simple Network Management Protocol (SNMP)," Network Working Group, Dec. 2002, available at www.ietf.org/rfc/rfc3415.txt, pp. 1-39.

ISO/IEC 8825-1, "Information technology—ASN.1 encoding rules: Specification of Basic Encoding Rules (BER), Canonical Encoding Rules (CER) and Distinguished Encoding Rules (DER)," 2008.

Wieringa, R. et al., "The identification of objects and roles," Technical Report IR-267, Faculty of Mathematics and Computer Science, Vrije Universiteit, Amsterdam, 1991, pp. 1-15.

International Search Report for International (PCT) Patent Application No. PCT/US2010/027319, mailed May 12, 2010.

Written Opinion for International (PCT) Patent Application No. PCT/US2010/027319, mailed May 12, 2010.

International Preliminary Report on Patentability for International (PCT) Patent Application No. PCT/US2010/027319, mailed Sep. 22, 2011 6 pages.

* cited by examiner

SECURE ACCESS MODULE FOR INTEGRATED CIRCUIT CARD APPLICATIONS

CROSS-REFERENCE TO RELATED APPLICATIONS

This Application claims the benefit of U.S. Provisional Application No. 61/160,191, filed Mar. 13, 2009, the entire disclosure of which is hereby incorporated herein by reference.

FIELD OF THE INVENTION

The present invention relates generally to data writing techniques and in particular mechanisms for securely writing data to a portable access credential.

BACKGROUND

As a part of providing secure access systems, some companies provide mechanisms which allow their clients to write data to portable identification cards. This capability is usually achieved by providing the client with some sort of device which is capable of interfacing with the portable cards and writing data thereto. Such devices are commonly referred to as programmers, field programmers, readers, reader-writers, printers, encoders, etc. Generally speaking, devices having the ability to write data to portable cards are referred to as card-access devices in that they have the ability to communicate with portable cards (usually an access credential in the form of an Integrated Circuit (IC) card) and write data thereto. While these card-access devices have the ability to write data to portable cards, they may also have the ability to read data from portable cards.

In many cases, such as when the portable card is being manufactured, initialized, or personalized, the card-access devices are operated by a computer program running on a general-purpose, multi-programming operating system such as Windows, Linux, or Mac O/S.

Because an IC card and other types of portable cards are a secure repository for data, before being able to read data from or write data to a portable card, one typically has to engage in an authentication protocol with the portable card. The purpose of requiring the authentication protocol is to ensure that the entity writing data to the portable card is authorized to access data in the portable card.

In the situation where a computer program running on a general-purpose, multi-programming operating system is being employed to access data on a portable card, the sensitive data (e.g., cryptographic keys and personal identification numbers) used to conduct these authentication protocols, as well as to protect the data being read from or written to in the portable card, may be exposed in plaintext or in the clear of the general-purpose computing environment. This sensitive data is thereby subject to compromise and breach by other programs such as malware, spyware, and software probes and debuggers concurrently running in the general-purpose, multi-programming operating system.

In the situation that the sensitive data used to conduct these authentication protocols as well as to protect the data being read from or written to the portable card is held in the card-access device, the sensitive data is subject to compromise and breach through the use of hardware probes and environmental attacks on the card-access device as these devices are not typically as secure as the portable card itself.

Accordingly, there exists a need to provide a card-access device and methods of operating the same which allow the general-purpose, multi-programming operating system to conduct the majority of data read and write operations on a portable card or the like while still maintaining a sufficient amount of security around the sensitive data used to communicate with the portable card.

SUMMARY

It is, therefore, one aspect of the present invention to provide a card-accessing device for accessing data in a Secure Access Module (SAM) (e.g., an IC card having an application stored thereon or an Application Specific Integrated Circuit (ASIC)) which is subsequently caused to execute one or more functions for writing data to a portable card (which may also be an IC card). In some embodiments, the card-access device writes data to the portable card exactly as if the routine were running on a general-purpose, multi-programming operating system attached to the card-access device or were running within the card-access device itself. In addition, this process is functionally seamless and the reading and/or writing functions executed by the SAM appear to the user as if the general-purpose, multi-programming operating system performed the functions.

In some embodiments, the physical and logical security capabilities of the SAM operating within the card-accessing device are at least as secure as, if not more secure than, the physical and logical security capabilities of the portable card having data written thereto or read therefrom.

In some embodiments, a SAM operating within a card-access device is provided. The SAM comprises at least some functionality that supports read and write operations which allow the SAM to read data from and/or write data to a portable card having sensitive data thereon or needing sensitive data written thereto. The SAM may be invoked by the operating system of the card-access device on which the SAM is located, but the SAM may operate independent of the operating system when dealing with sensitive data in either a read or write operation.

In accordance with at least one embodiment, a method is provided that generally comprises:

initiating a transaction between a card-accessing device and a portable card;

determining that a portion of the transaction between the card-accessing device and the portable card involves the use of sensitive data; and invoking a SAM contained within the card-accessing device to carry out the portion of the transaction involving the use of sensitive data, wherein the SAM comprises functionality sufficient to carry out the portion of the transaction involving the use of sensitive data.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

The invention will be illustrated below in conjunction with an exemplary communication system. Although well suited for use with, e.g., a system using computers, servers, and other computing devices, the invention is not limited to use with any particular type of computing or communication device or configuration of system elements. Those skilled in the art will recognize that the disclosed techniques may be used in any application in which it is desirable to implement secure applications in an otherwise unsecure computing environment.

The exemplary systems and methods of this invention will also be described in relation to analysis software, modules, and associated analysis hardware. However, to avoid unnecessarily obscuring the present invention, the following description omits well-known structures, components and devices that may be shown in block diagram form that are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
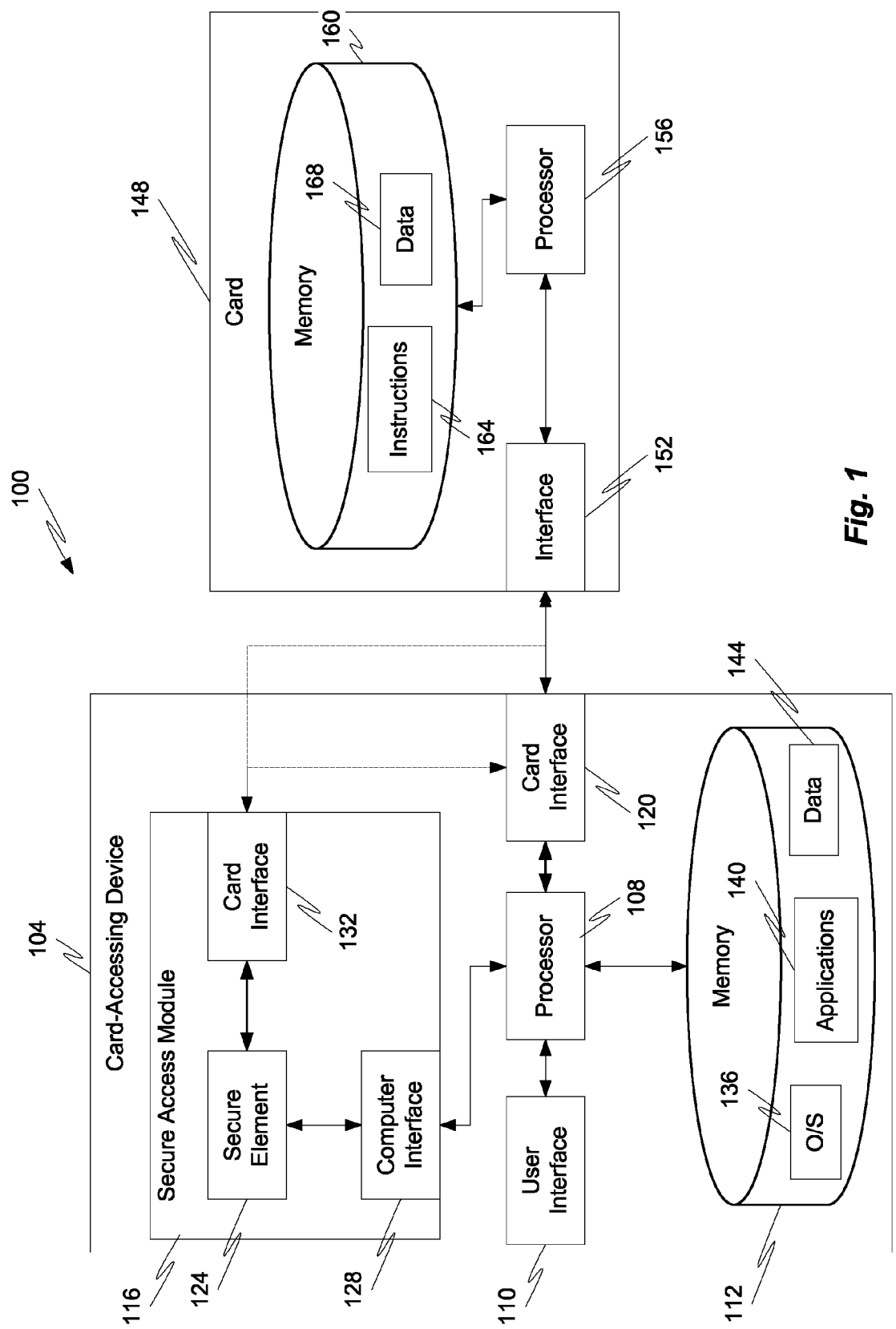
FIG. 1 depicts a communication system in accordance with embodiments of the present invention.

Referring initially to FIG. 1, details of a communication system 100 are depicted in accordance with at least some embodiments of the present invention. The communication system 100 generally comprises a card-accessing device 104 that is capable of communicating with, reading data from, and/or writing data to an access credential or similar type of portable card 148. For example, the portable card 148 may correspond to any type of portable access credential such as an Integrated Circuit (IC) card, a smart card, a key fob, a Near Field Communications (NFC) enabled mobile communication device, and the like.

In some embodiments, the card 148 includes an interface 152, a processor 156, and memory 160. The processor 156 is generally capable of executing instructions 164 stored in memory 160 as well as accessing data 168 stored in memory 160. In some embodiments, the processor 156 may facilitate the writing of data 168 and/or instructions 164 to memory 160 in accordance with writing instructions received from the card-accessing device 104. Examples of the types of data 168 that can be read from or written to memory 160 include, without limitation, a cryptographic algorithm, a cryptographic key, a personal identification number, a social security number, an account number, a password, and combinations thereof.

The card-accessing device 104 may correspond to a general-purpose computer or computing platform. In particular, the card-accessing device 104 may comprise an unsecure computing environment including a processor 108 and memory 112. The environment in which the processor 108 and memory 112 are maintained is considered unsecure because the physical and/or logical security capabilities associated with the processor 108 and/or memory 112 are not guaranteed to be as high as the security capabilities of the card 148. One reason the security capabilities of the unsecure environment may be suspect is because the memory 112 includes an operating system 136 and other applications 140 which are prone to certain viruses, bugs, or attacks from unscrupulous third parties. Accordingly, any data 144 maintained in memory 112 is not guaranteed to be as securely protected as data 168 maintained in memory 160 of the card 148. Likewise, any data processed by the processor 108 may be subject to similar attacks. Exemplary card-accessing devices include, without limitation, programmers, field programmers, readers, reader-writers, printers, encoders, etc.

The card-accessing device 104 is, therefore, provided with a Secure Access Module (SAM) 116 that generally has physical and/or logical security capabilities that are at least as good as the physical and/or logical security capabilities of the card 148. The SAM 116 is configured to execute any portion of a transaction with the card 148 that involves the use of sensitive data 168. In some embodiments, the sensitive data 168 may be read from the card 148 onto the SAM 116. In some embodiments, the sensitive data 168 may be written to the card 148 by the SAM 116. In either or both cases, the security capabilities of the SAM 116 are leveraged to ensure that sensitive data is not exposed to attacks during a transaction with the card 148. In other words, the SAM 116 ensures that sensitive data is not exposed to the unsecure environment of the card-accessing device 104. This means that transactions between the SAM 116 and card 148 occur directly between the SAM 116 and card 148 and bypass the processor 108, memory 112, and other unsecure circuitry of the card-accessing device 104.

In some embodiments, the SAM 116 comprises a secure element 124 which provides the functionality necessary to allow the SAM 116 to engage in data transactions with the card 148. The secure element 124 may also contain any instances of sensitive data, whether temporary (i.e., in buffer memory) or permanent (i.e., in volatile or non-volatile memory, such as an Electronically Erasable Programmable Read Only Memory (EEPROM)).

In particular, the secure element 124 may comprise any type of secure platform for receiving and securing sensitive data. In some embodiments, the secure element may comprise a tamper-resistant or tamper-proof processor. As one example, the SAM 116 may comprise an Integrated Circuit (IC) card and the secure element 124 may comprise an application, usually in the form of an applet, programmed into the IC. Alternatively, or in addition, the SAM 116 may comprise a Subscriber Identity Module (SIM) card having a secure element 124 in the form of an applet programmed therein.

Alternatively, or in addition, the SAM 116 may comprise an Application Specific Integrated Circuit (ASIC) that has been specifically programmed for executing functions particular to the SAM 116. In some embodiments, the instructions provided in the ASIC may be similar or identical to the instructions that would be otherwise included in the application programmed into an IC or SIM card.

The ASIC or the application programmed into the IC or SIM card may be capable of supporting the features and functions of the SAM 116. For example, the application programmed into the secure element 124 may comprise instructions which allow the SAM 116 to receive instructions from the unsecure environment via the computer interface 128 instructing the SAM 116 to begin executing a transaction with the card 148. Stated another way, the computer interface 128 may be utilized by the unsecure environment to invoke the SAM 116 to perform a portion of a transaction with the card 148 that requires use of sensitive data.

The secure element 124 may also contain instructions which control the operations (e.g., read and/or write functions) of the SAM 116 during a transaction with a card 148. The secure element 124 may also contain instructions which help the SAM 116 establish a secure communications channel with the card 148. The secure element 124 may also comprise encoding/decoding and/or encryption/decryption instructions which allow the secure element 124 to secure messages before they are transmitted to the card 148 or unsecure messages received from the card 148.

The SAM 116 also comprises a card interface 132 which allows the SAM 116 to communicate with the card 148. In some embodiments, the card interface 132 allows the SAM 116 to connect directly with an interface 152 of the card 148. In some embodiments, the card interface 132 allows the SAM 116 to utilize a card interface 120 of the card-accessing device (i.e., the same interface which is also used by the unsecure environment to communicate with the card 148) to communicate with the card 148. It is also possible that two communication paths may be established between the SAM 116 and a card 148 without departing from the scope of the present invention.

In configurations where the card interface 132 of the SAM 116 connects to the card 148 via the card interface 120 of the card-accessing device 104, the card interface 132 of the SAM 116 may comprise a physical or logical module that enables the SAM 116 to establish a secure communications channel with the card 148 through the card interface 120. In some embodiments, the card interface 132 may comprise a driver for controlling certain operations of the physical card interface 120. In some embodiments, the card interface 132 may be capable of establishing a communication channel with the card 148 that is secured by encryption using an encryption key (or derivative thereof) known to the card 148.

In some embodiments, the card interface 120, 132 may correspond to a wireless communication interface which allows the card-accessing device 104 to communicate wirelessly with the card 148. Likewise, the interface 152 of the card 148 may also comprise a similar wireless communication interface that is compatible with the card interface 120, 132. In a wireless configuration, the interfaces 120, 132, and/or 152 may comprise Radio Frequency (RF) antennas which are driven by driver circuits, resonators, or the like contained within the interfaces 120, 132, and/or 152.

Alternatively, or in addition, contact-based interfaces 120, 132, 152 may be utilized to facilitate transactions between the card 148 and card-accessing device 104. The card interface 120 may correspond to a USB port, serial port, Ethernet port, RS-232port, or any other known type of communication port that facilitates inter-device communications. The interface 152 of the card may comprise a port similar to the card interface 120 or some other mechanism which mates with the card interface 120 to facilitate a physical connection between the card 148 and card-accessing device 104. In such an embodiment, the card interface 132 may comprise functionality sufficient to leverage the card interface 120 and establish a communication channel with the card 148.

In some embodiments, the card-accessing device 104 also comprises a user interface 110 which facilitates user interactions with the card-accessing device 104. The user interface 110 may comprise a user input and/or user output. Examples of a user input include, without limitation, a keyboard, keypad, touchpad, mouse, rollerball, and the like. The user input is generally responsible for converting motion of a user into an electronic signal that is useable within the card-accessing device 104. Examples of a user output include, without limitation, a speaker, a light, a series of lights, a Light Emitting Diode (LED) display, a Liquid Crystal Display (LCD), a plasma display, or any other component capable of rendering electronic information in a physically-accessible format. As noted above, the user interface 110 may comprise a combined user input and user output, possibly in the form of a touch-screen interface or the like.

Figure 2:
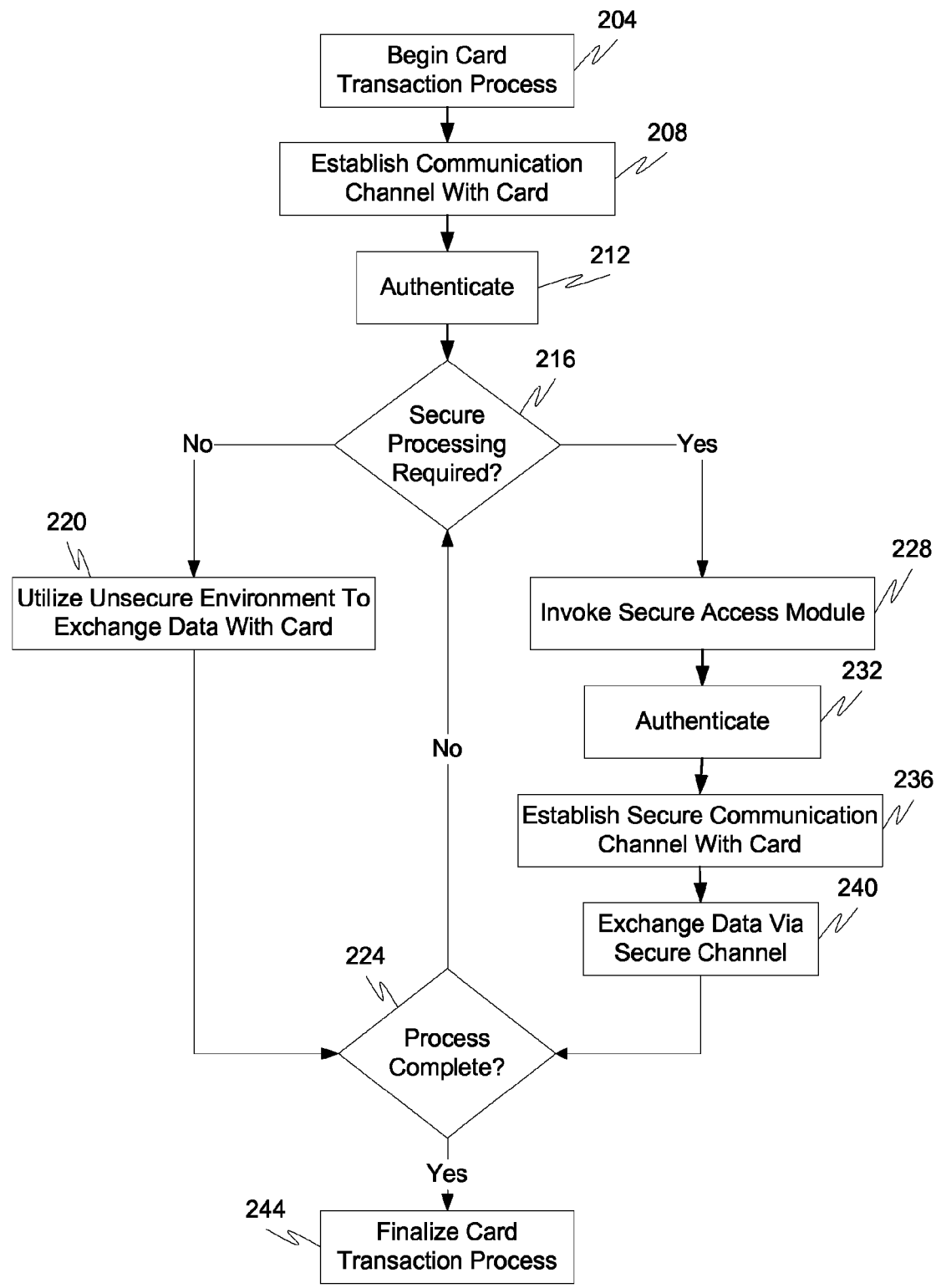
FIG. 2 is a flow chart depicting a card transaction method in accordance with embodiments of the present invention.

Referring now to FIG. 2, an exemplary transaction method will be described in accordance with at least some embodiments of the present invention. The method begins when a card transaction process is identified as commencing (step 204). The initiation of a card transaction process may occur automatically upon presentation of the card 148 to the card-accessing device 104. For example, the process may initiate automatically when a card 148 is inserted into or otherwise connected to the card interface 120. Alternatively, the process may initiate when user input is received at the user interface 110 instructing the card-accessing device 104 to begin a card transaction process. The card transaction process may include one or more of a data reading, data writing, instruction reading, instruction writing, or physical printing process.

Thereafter, the method continues with the card-accessing device 104 establishing a communication channel with the card (step 208). The communication channel may be initially established between the card 148 and the unsecure environment of the card-accessing device 104 via the card interface 120. In particular, the communication channel may be established between the processor 108 and processor 156.

After the communication channel has been initially established, the method continues with an authentication step (step 212). The authentication may be a mutual authentication between the card 148 and the card-accessing device where both entities confirm the identity of the other entity to ensure that the other entity is trusted or at least permitted to conduct transactions with the verifying entity. The authentication may, alternatively, be a unilateral authentication where either the card 148 authenticates the card-accessing device 104 or vice versa.

Following authentication, and assuming such authentication has been successfully completed, the method continues by determining whether any secure processing is required (step 216). In some embodiments, the determination in step 216 is made by the processor 156 of the card 148 and communicated to the card-accessing device 104. In some embodiments, the determination in step 216 is made by the processor 108 of the card-accessing device 104. Secure processing is usually required when some amount of sensitive data needs to be communicated between the card-accessing device 104 and the card 148. Examples of sensitive data include, without limitation, a cryptographic algorithm, a cryptographic key, a personal identification number, a social security number, an account number, a password, and combinations thereof.

Conversely, the query in step 216 may be answered by determining whether the next portion of the card transaction process does not require the use of sensitive data (i.e., whether unsecure processing is allowable). Exemplary transaction portions where unsecure processing is allowable include, but are not limited to, physically printing an image on the card 148, physically printing one or more characters on the card 148, verifying that data has been accurately written to the card 148, writing non-sensitive data to the card 148, and reading non-sensitive data from the card 148.

In the event that secure processing is not required, the method continues with the unsecure environment conducting the transaction with the card 148 (step 220). Once the transaction step analyzed in step 216 has been completed, the method proceeds by determining whether or not the card transaction process has completed (step 224). Again, this determination may be made at the card-accessing device 104 or at the card 148.

If the card transaction process is determined to be incomplete, then the method returns to step 216.

At step 216, if it is determined that secure processing is required, then the method proceeds with the processor 108 invoking the SAM 116 (step 228). This step may include the processor 108 transmitting a command to the secure element 124 via the computer interface 128 causing the secure element 124 to begin its internal transaction process. The invoking step may also identify the type of secure processing that is required. In particular, the processor 108 may identify to the secure element 124 whether a writing step or a reading step is required. The processor 108 may also identify a type of data needed from the card 148 or type of data to be written to the card 148, thereby allowing the secure element 124 to obtain the actual data corresponding to the type of data identified by the invoking command.

Thereafter, the method continues with an optional additional authentication between the SAM 116 and card 148 (step 232). The authentication between the SAM 116 and card 148 may be mutual or unilateral.

After the authentication step has completed, assuming it was required, the method continues by establishing a secure communication channel between the SAM 116 and the card 148 (step 236). The secure communication channel may be correspond to a cryptographic channel set up between the SAM 116 and card 148 that traverses the card interface 120. In particular, messages exchanged between the SAM 116 and card 148 via the card interface 120 may be encrypted according to an agreed-upon encryption technique. Alternatively, the secure communications channel may comprise a channel established directly between the card interface 132 of the SAM 116 and the interface 152. In either situation, the secure communications channel is configured to bypass the processor 108 and memory 112 of the unsecure environment. Functions within the secure element 124 may be utilized in generating the secure communications channel.

Once a communication channel has been established between the card-accessing device 104 and the card 148, the method continues with the exchanging of sensitive data via the secure channel (step 240). This exchange of sensitive data may comprise a reading of the sensitive data from the card 148 onto the SAM 116 or a writing of sensitive data from the SAM 116 to the card 148. Additionally, the SAM 116 may be configured to verify the accuracy of data written to the card 148 as a part of the secure transaction process.

After the sensitive data has been completed and it is determined that the secure processing step has been performed, the method continues to step 224. If it is determined that the card transaction process is not complete, then the method returns to step 216. If more secure processing is required, the already established secure communications channel may be utilized to carry out the next part of the card transaction process. If, however, secure processing is not required, then the SAM 116 may relinquish control of the transaction from to the unsecure environment of the card-accessing device such that the next step of the transaction can be completed by the processor 108 residing within the unsecure environment.

If it is determined that the card transaction process is complete, then the method continues to a final step where the card transaction process is finalized and the card 148 is released by the card-accessing device 104 (step 244). In this step, the card-accessing device 104 may confirm that data has been accurately written to the card 148 by providing the card 148 with a challenge. The finalization step may also include closing any communications channels previously established with the card 148 to facilitate the card transaction process. The finalization step may also include confirming whether the card 148 is allowed to access an asset controlled by the card-accessing device 104 and permitting such access if allowed.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as TPM, PLD, PLA, FPGA, PAL, a communications device, such as a server, personal computer, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an integrated circuit card applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for sharing sensitive data between entities. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method comprising:
   initiating a transaction between a card-accessing device and a portable card;
   determining that a portion of the transaction between the card-accessing device and the portable card involves the use of sensitive data; and invoking a Secure Access Module contained within the card-accessing device to carry out the portion of the transaction involving the use of sensitive data, wherein the Secure Access Module comprises functionality sufficient to carry out the portion of the transaction involving the use of sensitive data;

determining that the portion of the transaction involving the use of sensitive data is completed; and after the portion of the transaction involving the use of sensitive data is determined to be completed, relinquishing control of the transaction from the Secure Access Module to an unsecure environment of the card-accessing device such that the transaction is completed by a processor residing within the unsecure environment.

2. The method of claim 1, wherein the processor residing within the unsecure environment performs additional steps in the transaction after obtaining control of the transaction from the Secure Access Module, wherein the additional steps include one or more of physically printing an image on the portable card, physically printing one or more characters on the portable card, verifying that data has been accurately written to the portable card, writing non-sensitive data to the portable card, and reading non-sensitive data from the portable card.

3. The method of claim 1, wherein the Secure Access Module comprises an Integrated Circuit card having at least one application programmed thereon, wherein the application comprises the functionality sufficient to carry out the portion of the transaction involving the use of sensitive data and wherein the Secure Access Module functionality carries out the portion of the transaction in a secure manner.

4. The method of claim 3, wherein the sensitive data is also contained within the Integrated Circuit card.

5. The method of claim 1, wherein the Secure Access Module comprises an Application Specific Integrated Circuit containing instructions which, when executed, provide the functionality sufficient to carry out the portion of the transaction involving the use of sensitive data.

6. The method of claim 1, wherein physical and logical security capabilities of the Secure Access Module operating within the card-accessing device are at least as secure as physical and logical security capabilities of the portable card.

7. The method of claim 6, wherein the portable card comprises an Integrated Circuit card and wherein the Secure Access Module comprises an Integrated Circuit card.

8. The method of claim 7, wherein a card interface of the card-accessing device is utilized by the Secure Access Module to communicate with the portable card and wherein a secure communication channel is established between the Secure Access Module and the portable card through the card interface of the card-accessing device.

9. The method of claim 8, wherein communications between the Secure Access Module and the portable card used to carry out the portion of the transaction involving the use of sensitive data bypass a processor residing in an unsecure environment of the card-accessing device.

10. The method of claim 1, wherein the portion of the transaction involving the use of sensitive data includes one or more of writing sensitive data from the Secure Access Module to the portable card and reading sensitive data from the portable card onto the Secure Access Module.

11. The method of claim 10, wherein the sensitive data comprises one or more of a cryptographic algorithm, a cryptographic key, a personal identification number, a social security number, an account number, and a password.

12. The method of claim 1, further comprising:
authenticating the Secure Access Module with the portable card;
after the authenticating step, establishing a secure communication channel between the Secure Access Module and the portable card; and
utilizing the secure communication channel to share the sensitive data between the Secure Access Module and the portable card.

13. A card-accessing device, comprising:
an unsecure environment including memory and a processor, the memory including instructions for executing one or more applications and instructions for executing an operating system, wherein the processor is configured to execute the instructions stored in memory;
a card interface configured to provide a communication channel between the processor and a portable card thereby facilitating a data transaction between the card-accessing device and the portable card; and
a Secure Access Module configured carry out a portion of the data transaction involving the use of sensitive data and during the portion of the data transaction involving the use of sensitive data utilize the card interface to communicate with the portable card, determine that the portion of the data transaction involving the use of sensitive data is completed, and then, after determining that the portion of the data transaction involving the use of sensitive data has completed, relinquish control of the transaction to the unsecure environment such that the transaction is completed by the processor of the unsecure environment.

14. The device of claim 13, wherein the Secure Access Module comprises an Integrated Circuit card having at least one application programmed thereon, wherein the application comprises the functionality sufficient to carry out the portion of the transaction involving the use of sensitive data.

15. The device of claim 14, wherein the sensitive data is also contained within the Integrated Circuit card.

16. The device of claim 13, wherein the Secure Access Module comprises an Application Specific Integrated Circuit containing instructions which, when executed, provide the functionality sufficient to carry out the portion of the transaction involving the use of sensitive data.

17. The device of claim 13, wherein physical and logical security capabilities of the Secure Access Module operating within the card-accessing device are at least as secure as physical and logical security capabilities of the portable card.

18. The device of claim 17, wherein the portable card comprises an Integrated Circuit card and wherein the Secure Access Module comprises an Integrated Circuit card.

19. The device of claim 18, wherein a secure communication channel is established between the Secure Access Module and the portable card through the card interface of the card-accessing device.

20. The device of claim 19, wherein communications between the Secure Access Module and the portable card used to carry out the portion of the transaction involving the use of sensitive data bypass the processor residing in the unsecure environment of the card-accessing device.

21. The device of claim 13, wherein the portion of the transaction involving the use of sensitive data includes one or more of writing sensitive data from the Secure Access Module to the portable card and reading sensitive data from the portable card onto the Secure Access Module.

22. The device of claim 21, wherein the sensitive data comprises one or more of a cryptographic algorithm, a cryptographic key, a personal identification number, a social security number, an account number, and a password.

23. A system, comprising:
a portable card; and
a card-accessing device configured to execute a data exchange transaction with the portable card, wherein a first portion of the data exchange transaction involving the use of sensitive data is executed by a Secure Access Module contained within the card-accessing device and wherein a second portion of the data exchange transaction not involving the use of sensitive data is executed after the first portion of the data exchange transaction is completed, the second portion of the data exchange transaction being executed by a processor residing in an unsecure environment of the card-accessing device, wherein the Secure Access Module is further configured to determine that the first portion of the data exchange transaction involving the use of sensitive data is completed and, in response thereto, invoke the second portion of the data exchange transaction to be executed.

24. The system of claim 23, wherein the processor also executes an operating system for the card-accessing device.

25. The system of claim 23, wherein the Secure Access Module comprises an Integrated Circuit card and wherein the portable card also comprises an Integrated Circuit card.

* * * * *